US012619052B2

(12) United States Patent
Park et al.

(10) Patent No.: US 12,619,052 B2
(45) Date of Patent: May 5, 2026

(54) ACTUATOR FOR REFLECTOR HAVING MOVING FRAME WITH REFLECTOR AND CAMERA MODULE INCLUDING THE SAME

(71) Applicant: JAHWA electronics Co., Ltd., Chungcheongbuk-do (KR)

(72) Inventors: Chul Soon Park, Chungcheongbuk-do (KR); In Su Kang, Chungcheongbuk-do (KR); Hyeon ik Cho, Daegu (KR); Jae Seon Lee, Chungcheongbuk-do (KR); Je Seung Yeon, Chungcheongbuk-do (KR)

(73) Assignee: JAHWA electronics Co., Ltd., Chungcheongbuk-do (KR)

( * ) Notice: Subject to any disclaimer, the term of this patent is extended or adjusted under 35 U.S.C. 154(b) by 923 days.

(21) Appl. No.: 17/775,020

(22) PCT Filed: Apr. 8, 2021

(86) PCT No.: PCT/KR2021/004414
§ 371 (c)(1),
(2) Date: May 6, 2022

(87) PCT Pub. No.: WO2021/206469
PCT Pub. Date: Oct. 14, 2021

(65) Prior Publication Data
US 2022/0390707 A1 Dec. 8, 2022

(30) Foreign Application Priority Data
Apr. 9, 2020 (KR) ........................ 10-2020-0043291

(51) Int. Cl.
*G02B 7/182* (2021.01)
*G03B 5/00* (2021.01)

(52) U.S. Cl.
CPC ............... *G02B 7/182* (2013.01); *G03B 5/00* (2013.01); *G03B 2205/0007* (2013.01)

(58) Field of Classification Search
CPC .... G02B 7/182; G02B 7/1821; G02B 7/1822; G02B 7/1827; G02B 7/1828
See application file for complete search history.

(56) References Cited

U.S. PATENT DOCUMENTS

2018/0356645 A1* 12/2018 Jeong ................... G02B 27/646

FOREIGN PATENT DOCUMENTS

JP       2018-205683 A    12/2018
KR  10-2009-0122892 A    12/2009
(Continued)

OTHER PUBLICATIONS

International Search Report for PCT/KR2021/004414 mailed on Jul. 15, 2021.

*Primary Examiner* — Lauren Nguyen
(74) *Attorney, Agent, or Firm* — The PL Law Group, PLLC

(57) ABSTRACT

An actuator for a reflector according to an embodiment of the present disclosure includes a moving frame having a reflector configured to reflect light to a lens, and a magnet, a base frame configured to provide a moving space for the moving frame, a driving coil configured to generate a magnetic force at the magnet so that the moving frame rotates based on the base frame, a guide rail formed at any one of the moving frame and base frame and having a rounded shape, a holder provided to any one of the moving frame and the base frame not provided with the guide rail, provided in a direction facing the guide rail, and having a groove shape; and a ball arranged between the guide rail and the holder.

7 Claims, 6 Drawing Sheets

(56)　　　　　　　References Cited

FOREIGN PATENT DOCUMENTS

| KR | 10-2015-0044360 A | 4/2015 |
| KR | 10-2018-0037877 A | 4/2018 |
| KR | 10-2018-0135392 A | 12/2018 |

* cited by examiner

FIG. 3

ACTUATOR FOR REFLECTOR HAVING MOVING FRAME WITH REFLECTOR AND CAMERA MODULE INCLUDING THE SAME

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/004414, filed Apr. 8, 2021, which claims priority to the benefit of Korean Patent Application No. 10-2020-0043291 filed in the Korean Intellectual Property Office on Apr. 9, 2020, the entire contents of which are incorporated herein by reference.

BACKGROUND

1. Technical Field

The present disclosure relates to an actuator for a reflector and a camera module including the same, and more specifically, to an actuator for a reflector that implements OIS or the like through improvement of a guiding structure that physically supports a ball.

2. Background Art

As the hardware technology for image processing has been developed and the user needs for image shooting have increased, functions such as autofocus (AF) and optical image stabilization (OIS) have been applied to a camera module or the like, mounted to a portable terminal such as a cellular phone and a smart phone as well as an independent camera device.

An autofocus (AF) function (or, an automatically focusing function) means a function of a focal length to a subject by linearly moving a carrier having a lens in an optical axis direction to generate a clear image at an image sensor (CMOS, CCD, etc.) located at the rear of the lens.

In addition, an optical image stabilization (OIS) function means a function of improving the sharpness of an image by adaptively moving the carrier having a lens in a direction to compensate for the shaking when the lens is shaken due to trembling.

One typical method for implementing the AF or OIS function is to install a magnet (a coil) on a mover (a carrier) and install a coil (a magnet) on a stator (a housing, or another type of carrier, or the like), and then generate an electromagnetic force between the coil and the magnet so that the mover moves in the optical axis direction or in a direction perpendicular to the optical axis.

Recently, a mobile terminal is equipped with a zoom lens that has specifications for variably adjusting a focal length or capture an image from a distance in order to meet increased user needs and implement user convenience in a more diverse manner.

The zoom lens has a structure in which a plurality of lenses or lens groups are arranged side by side, or has a characteristic that the lens is long based on the optical axis, so a larger mounting space must be provided in the mobile terminal.

Recently, in order to organically graft the physical characteristics of the zoom lens with the geometric characteristics of a portable terminal, an actuator or camera module having a physical structure that allows the light of a subject to be refracted using a reflector placed in front of the lens has been disclosed.

The actuator or the like employing a reflector does not correctively move the lens according to hank shaking, but implements OIS for the hand shaking by moving the reflector, which reflects the light of the subject, toward the lens in one or two axes.

Typically, a guide rail is formed on each of a moving body (an object provided with a reflector) and a fixed body, and a plurality of balls are disposed therebetween so that the moving body rotates along the guide rail while being supported by the balls.

However, in this conventional structure, since the balls arranged between the guide rails move freely, the positions of the balls are not fixed or specified, so the physical points supported by the balls are constantly changing.

If the physical points supported by the balls are changed in this way, the distance between the balls changes, and also the balls tend to be biased in one direction repeatedly. In addition, the biased direction or position also changes every moment, so the balance support of the moving body on which the reflector is mounted is broken, thereby causing the reflector to be tilted.

In particular, in the case of a high magnification lens such as a zoom lens, even if a slight tilt occurs, it has a significant effect on the image sensor, so that a significant amount of image deterioration may occur.

In addition, there is a technique in which three or more balls are arranged between the guide rails to reduce the tilting problem of the moving body. However, even in this case, since the balls are constantly moving, it is difficult to fundamentally solve the tilting problem.

Furthermore, in this technique, balls of relatively small size must be arranged. However, as the size of the balls decreases, the physical behavior characteristics of the balls due to rolling/rotating and moving deteriorate, which may adversely affect the precision of OIS.

In addition, as the size of the balls is smaller, the balls made of a material such as metal or ceramic material having higher rigidity than plastic apply a greater physical pressure or impact to the guide rails made of plastic or the like, so the possibility of physical damage to the guide rails is increased, which may also act as a cause of lowering the precision of OIS.

SUMMARY

The present disclosure is designed to solve the problems of the related art, and therefore the present disclosure is directed to providing an actuator for a reflector, which may dramatically improve the precision according to the rotational movement of a moving body equipped with a reflector by effectively improving the physical support structure of balls.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

An actuator for a reflector according to the present disclosure to accomplish the above object may comprise a moving frame having a reflector configured to reflect light to a lens, and a magnet; a base frame configured to provide a moving space for the moving frame; a driving coil configured to generate a magnetic force at the magnet so that the moving frame rotates based on the base frame; a guide rail formed at any one of the moving frame and base frame and having a rounded shape; a holder provided to any one of the moving frame and the base frame not provided with the guide rail, provided in a direction facing the guide rail, and having a groove shape; and a ball arranged between the guide rail and the holder.

Here, the holder may include a plurality of holders arranged side by side to correspond to a longitudinal direction of the guide rail, and the ball may be arranged at each of the plurality of holders.

In addition, the plurality of holders may be spaced apart from the guide rail by the same distance based on the direction facing the guide rail.

Moreover, an inner surface of the holder may include at least one plane that makes a point contact with the ball, and the plane may have a shape that becomes narrower inward.

According to an embodiment, the actuator for a reflector according to the present disclosure may further comprise a yoke provided to the base frame to generate an attractive force at the magnet, and a center of a portion of the yoke facing the magnet may coincide with a center of the magnet.

According to an embodiment of the present disclosure, since the position of the ball disposed between the movable body and the fixed body to guide the rotational movement of the movable body is specified at the exact position regardless of OIS driving, the physical support according to the rotational movement of the movable body is more balanced, so it is possible to fundamentally prevent the moving body from being tilted.

According to another embodiment of the present disclosure, since a plurality of balls may be arranged such that the pitch between the balls may be designed to be optimized for the rotational movement of the moving body, so the balls may provide more stable physical support and further improve the precision of the OIS therethrough.

In addition, according to the present disclosure, relatively large-sized balls may be arranged in an actuator of the same size, which may improve the behavioral properties of the balls as well as further suppress the physical adverse effect generated between the balls and the guide rail, so it is possible to improve the driving performance and further improve durability.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 3 is a diagram showing a moving frame according to an embodiment of the present disclosure and relevant components in detail.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
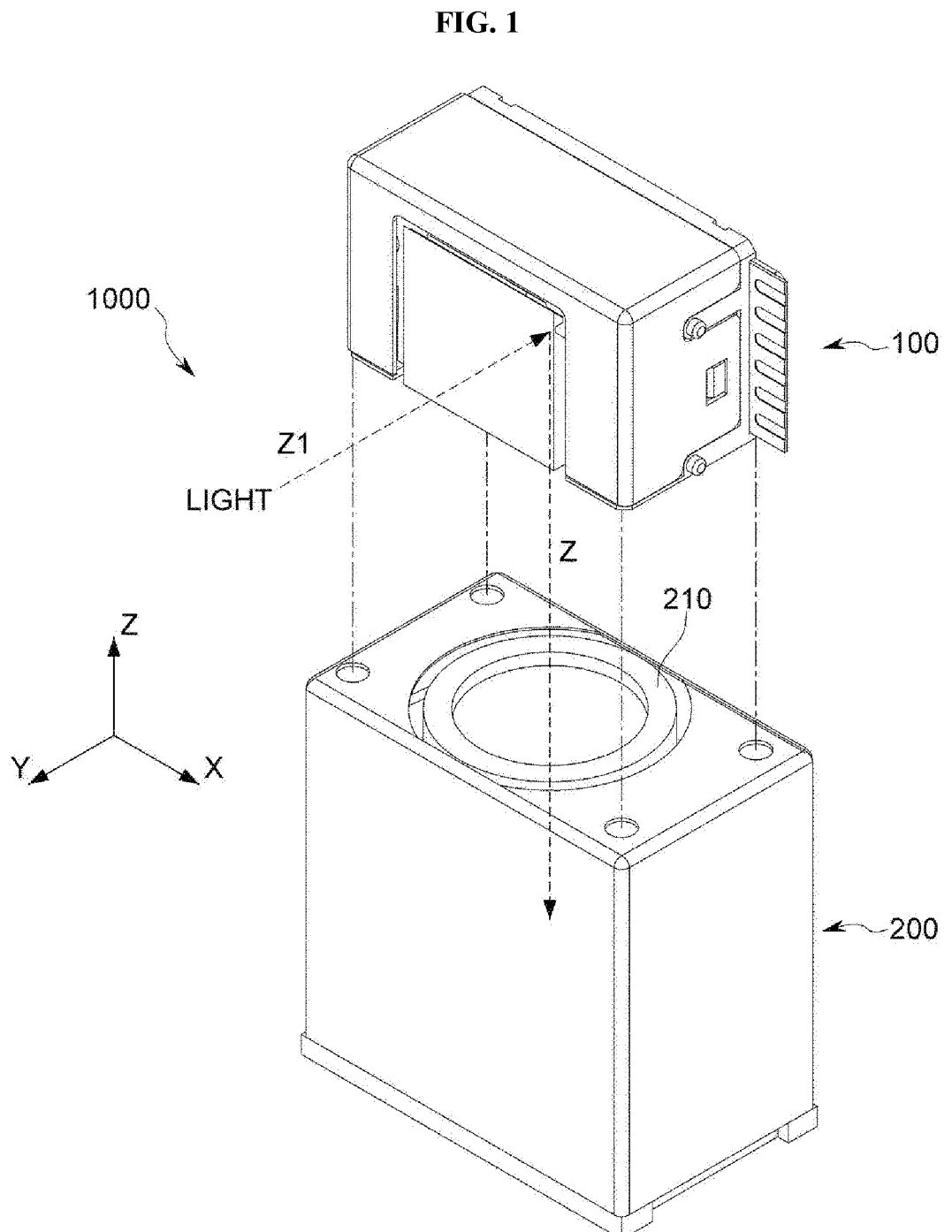
FIG. 1 is a diagram showing an overall configuration of an actuator according to an embodiment of the present disclosure and a camera module.

FIG. 1 is a diagram for illustrating an overall configuration of an actuator 100 for a reflector (hereinafter, referred to as an 'actuator') according to an embodiment of the present disclosure and a camera module 1000 including the actuator.

The actuator 100 of the present disclosure may be implemented as a single device, and as shown in FIG. 1, may also be implemented in the form of a camera module 1000 including a lens assembly 210, a lens driving module 200 for autofocusing the lens assembly 210, an image sensor (not shown) and the like.

According to the present disclosure, the light of a subject does not flow directly into the lens assembly 210, but the light is introduced to the lens assembly 210 after the path of light is changed by means of a reflector 110 provided in the actuator 100 of the present disclosure (by refraction, reflection, or the like).

As shown in FIG. 1, the path of light entering from the outside is Z1, and the path of light introduced into the lens assembly 210 after being refracted or reflected by the reflector 110 is Z. In the following description, a Z-axis direction corresponding to a direction in which light is introduced into the lens assembly 210 will be referred to as an optical axis or an optical axis direction.

The lens assembly 210 may be a single lens as well as a zoom lens in which a plurality of lenses or a lens group or an optical member such as a prism, a mirror, or the like may be included. If the lens assembly 210 is configured using a zoom lens or a zoom lens barrel, it may be formed to extend along the vertical longitudinal direction (Z-axis direction).

Though not shown in the drawings, based on the optical axis direction, the image sensor such as CCD or CMOS that converts a light signal into an electrical signal may be provided at a rear end of the lens driving module 200, and a filter that blocks or transmits a light signal of a specific frequency band may also be provided together.

As will be described in detail later, when shaking occurs due to hand shaking or the like based on the first direction (Y-axis direction) perpendicular to the optical axis, the actuator 100 of the present disclosure corresponds to a device that implements OIS in the first direction by rotating the reflector 110 in a direction to compensate for the motion.

In addition, although not shown in the drawings, in the actuator 100 or the camera module 1000 of the present disclosure, the frame structure may be diversified to move in each direction, and the reflector 110 may be configured to move (or rotate) even in the second direction (X-axis direction) perpendicular to both the optical axis and the first direction through the relative movement of the diversified frame structure, thereby integrally implementing the OIS in the first direction and the second direction.

Depending on embodiments, the OIS in any one of the first direction and the second direction may be implemented through rotational movement of the reflector 110, and the OIS in the other direction may be implemented by driving the lens assembly 210 to move linearly in the second direction (X-axis direction).

Figure 2:
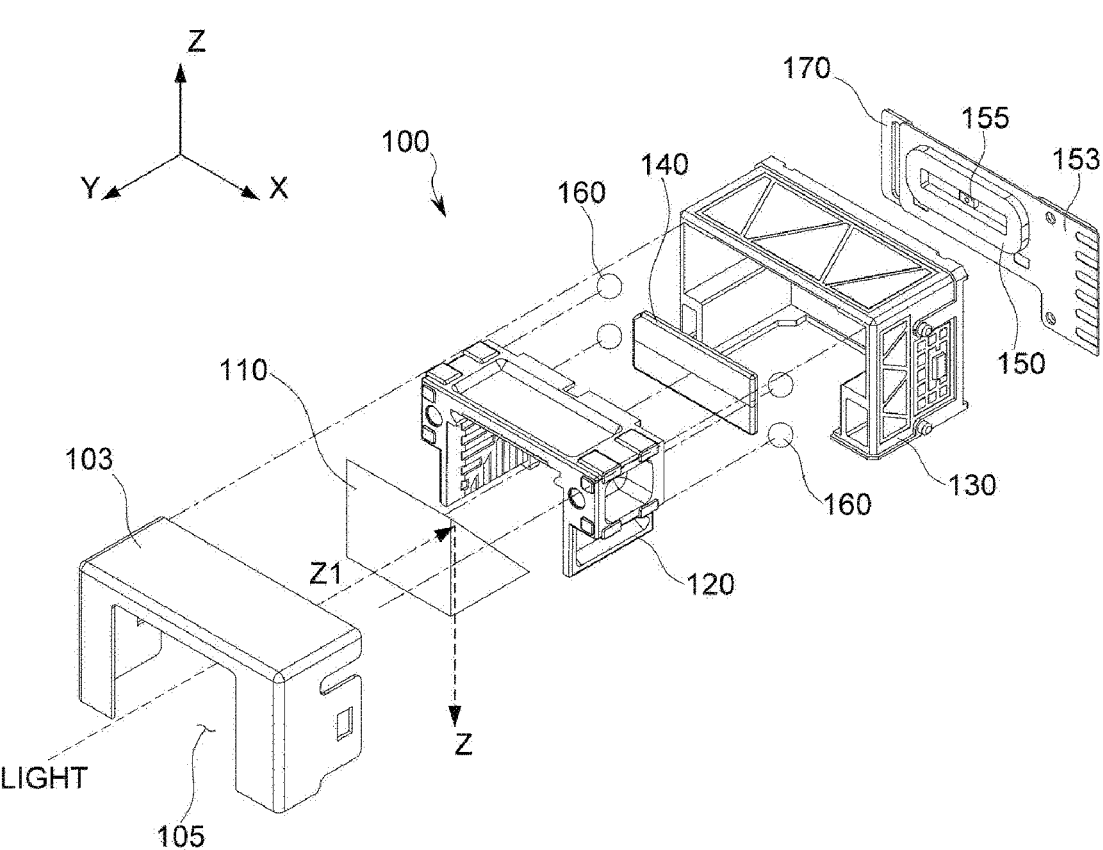
FIG. 2 is an exploded view showing a detailed configuration of the actuator according to an embodiment of the present disclosure and a camera module.

FIG. 2 is an exploded view showing a detailed configuration of the actuator 100 according to an embodiment of the present disclosure.

As shown in FIG. 2, the actuator 100 of the present disclosure may be configured to include a case 103 having an opening 105 and functioning as a shield can, a reflector 110, a moving frame 120, a base frame 130, a magnet 140, a driving coil 150 and a ball 160.

As shown in FIG. 2, when the light of a Z1 path enters the actuator 100 of the present disclosure through the opening 105 of the case 103, the reflector 110 of the present disclosure changes (refracts, reflects, or the like) the path of the introduced light to the optical axis direction (Z) and introduces the light toward the lens assembly 210.

The reflector 110 may be any one selected from mirrors and prisms, or a combination thereof, and further, the reflector 110 may be implemented using various members capable of changing light introduced from the outside to the optical axis direction.

Since the present disclosure is configured to allow light to flow into the lens assembly 210 after the path of light is refracted by the reflector 110 as described above, the lens assembly 210 does not need to be installed in a thickness direction of a mobile terminal. Thus, even if a lens having a long physical characteristic in the optical axis direction like a zoom lens is mounted to a portable terminal, the thickness of the portable terminal is not increased. This may be optimized for miniaturization of the portable terminal.

As well known in the art, the OIS driving is implemented by moving a lens in a direction to compensate for shaking caused by hand shaking. However, in the embodiment of the present disclosure, the OIS driving is implemented by moving the reflector 110, unlike the above method in which the lens or the like is moved.

The magnet 140 installed at the moving frame 120 is a magnet for OIS driving, and as shown in FIG. 2, it is preferable that the magnet 140 is installed in a direction in which the reflector 110 is not installed, so as to increase the structural efficiency and not to interfere with the light path.

The magnet 140 receives a driving force by an electromagnetic force from the driving coil 150, and the moving frame 120 of the present disclosure at which the magnet 140 is installed rotates based on the base frame 130 by the driving force.

In this respect, the base frame 130, which provides moving space for the moving frame 120, corresponds to a fixed body in a relative viewpoint with respect to the moving frame 120.

If the moving frame 120 at which the reflector 110 is installed is rotationally moved (on the Y-Z plane) based on the base frame 130, the reflector 110 rotates together with the physical movement of the moving frame 120, and the OIS for the first direction is implemented as the position where the light of the subject is introduced toward the image sensor (not shown) is shifted due to the rotational movement of the reflector 110.

The ball 160 may be positioned between the moving frame 120 disclosure and the base frame 130 of the present, and in this case, the moving frame 120 of the present disclosure rotates in contact with the ball 160.

As illustrated in the drawing, the magnet 140 is installed at the center of the moving frame 120 so that the rotational movement of the moving frame 120 is stably supported and the driving precision is improved, and the ball 160 is preferably located at both sides to be symmetrical based on the magnet 140.

The yoke 170 made of a magnetic material such as metal functions to concentrate the electromagnetic force of the driving coil 150 and generate an attractive force at the magnet 140 provided to the moving frame 120.

By the attractive force generated in this way, the moving frame 120 at which the magnet 140 is installed is pulled in a direction where the yoke 170 is provided (−Y-axis direction), namely toward the base frame 130, so the base frames 130 and the ball 160 as well as the ball 160 and the base frame 130 are in close contact with each other.

In addition, the yoke 170 may also functions to restore the moving frame 120 to its original reference position when the power supply to the driving coil 150 is stopped. In order to improve the efficiency of functional control for the rotational movement of the moving frame 120, the restoration to the reference position is preferably performed such that the physical center of the portion of the yoke 170 facing the magnet 140 coincides with the center of the magnet 140.

The driving coil 150 that generates an electromagnetic force at the magnet 140 is implemented to be mounted to a FPCB (Flexible Printed Circuit Board) 153. As shown in the drawings, the FPCB 153 may include a hall sensor 155 for detecting the position of the magnet 140 (specifically, the reflector 110 installed at the moving frame 120 provided with the magnet 140) using the Hall Effect.

The hall sensor 155 may be implemented in the form of a single chip together with a driver that controls the magnitude and direction of power applied to the driving coil 150 by using the output value of the hall sensor 155 for feedback control.

Figure 3:
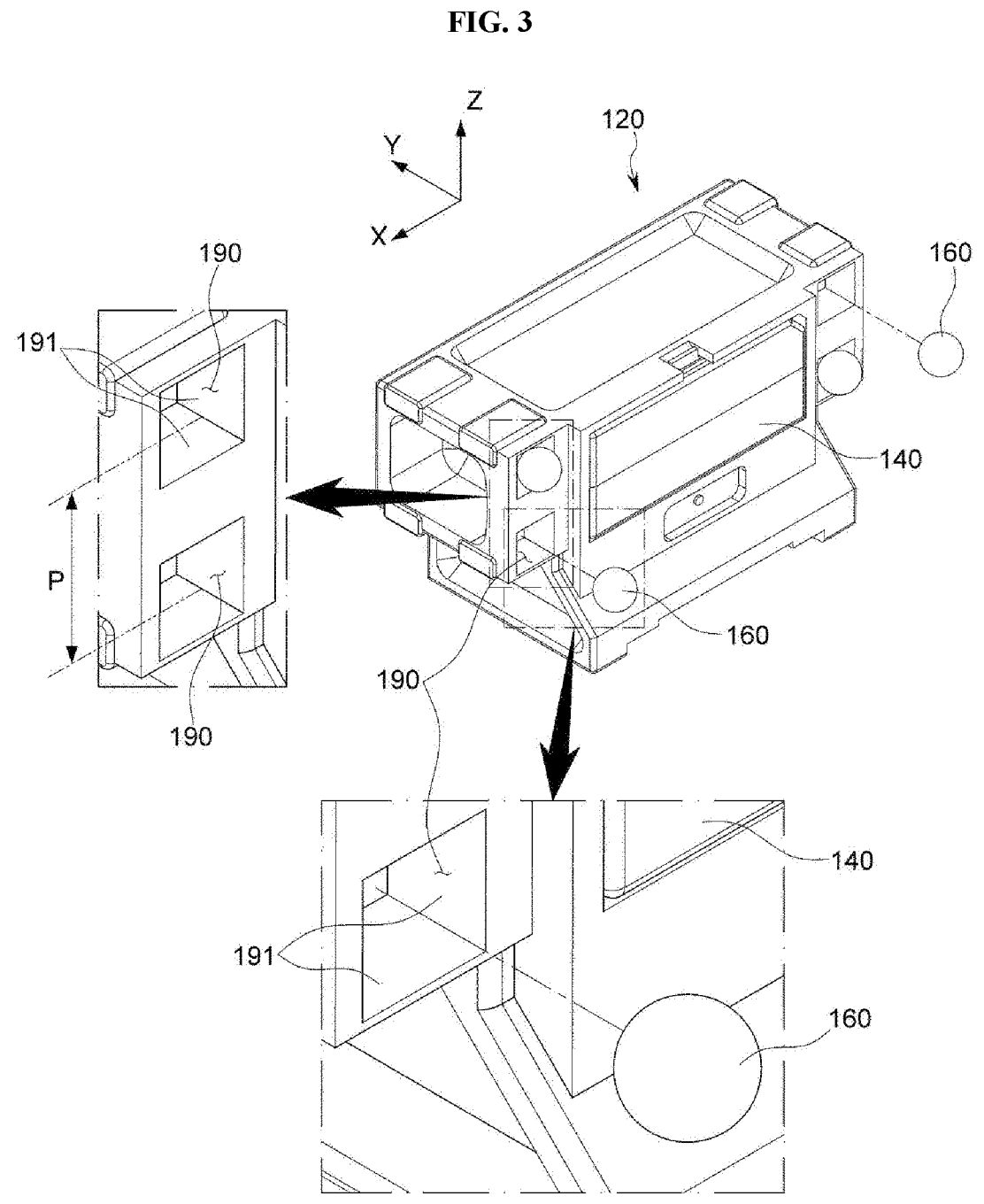
Figure 4:
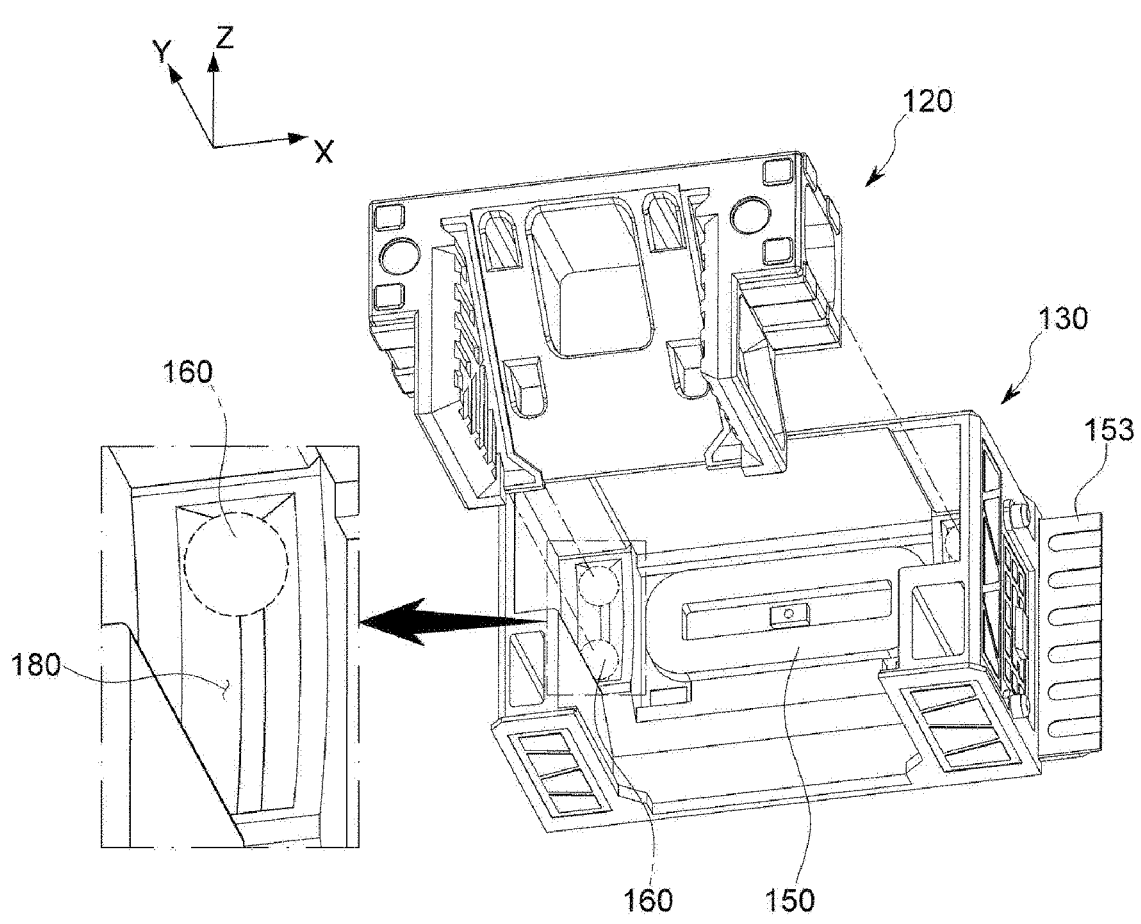
FIG. 4 is a diagram showing a base frame according to an embodiment of the present disclosure and relevant components.

FIG. 3 is a diagram showing the moving frame 120 according to an embodiment of the present disclosure and relevant components in detail, and FIG. 4 is a diagram showing the base frame 130 according to an embodiment of the present disclosure and relevant components.

As shown in FIGS. 3 and 4, a guide rail 180 configured to physically guide the rotational movement of the moving frame 120 based on the Y-Z plane and having a rounded shape is formed at any one of the moving frame 120 and the base frame 130.

In the corresponding point of view, a holder 190 provided in a direction facing the guide rail 180 and having a groove shape is provided at the other one of the moving frame 120 and the base frame 130, where the guide rail 180 is not formed.

FIG. 3 or the like illustrates that the guide rail 180 is provided at the base frame 130 and the holder 190 is provided at the moving frame 120, but this is only an example. Since the guide rail 180 and the holder 190 are in a corresponding relationship to each other, unlike the illustrated embodiment, it is also possible that the guide rail 180 is provided at the moving frame 120 and the holder 190 is provided at the base frame 130.

Since the ball 160 is located at the holder 190 to be partially accommodated in the holder 190, even if the rotational movement of the moving frame 120 is made, the ball 160 maintains its position accommodated in the holder 190.

Specifically, the holder 190 of the present disclosure may be provided in plural, so that the plurality of holders 190 are arranged side by side to correspond to the longitudinal direction of the guide rail 180, respectively, and as shown in the figures, the plurality of holders 190 may be provided at both sides in pairs based on the physical location of the magnet 140. In this case, the ball 160 may be provided to each holder 190.

In addition, as shown in FIG. 3, since the holders 190 are spaced apart (P in FIG. 3) at an appropriate interval and the ball 160 is arranged at each holder 190, the distance between the balls 160 is also maintained as the spaced distance P.

Through this structure, the ball 160 according to the present disclosure may perform a rolling or rotating motion in a state of being accommodated in the holder 190, but does not move from a relative viewpoint with the moving frame 120. Furthermore, since the distance between the balls 160 is maintained constant, it is possible to essentially solve the problems of the prior art, such as instable support, tilting of the moving body, deterioration of the driving precision, and the like, caused by the free movement of the ball.

Moreover, in the present disclosure, since the balls 160 may be spaced at an appropriate distance, it is possible to secure as much additional space as possible, thereby allowing balls of a relatively larger size to be applied.

Therefore, in the present disclosure, it is possible to improve durability and further improve driving precision by reducing physical damage to other components such as the guide rail 180 in physical contact with the ball 160.

For implementation of a more preferred embodiment, the holder 190 of the present disclosure may be configured such that its inner surface 191 has at least one plane.

In this configuration, since the holder 190 and the ball 160 may be induced to make point contact with each other, the rotation/rolling of the ball 160 may be made with a more minimized frictional force, so it is possible to further increase the driving efficiency according to the rotational movement of the moving frame 120.

In addition, it is preferable that the inner surface 191 of the holder 190 is configured to have a shape structure that becomes narrower inward as shown in FIG. 3 so that point contact with the ball 160 and physical support by the ball 160 are more effectively implemented.

That is, the holder 190 of the present disclosure may have an inner groove having a polygonal pyramid shape, such as a quadrangular pyramid, or may be implemented with a polygonal pyramid shape whose upper vertex portion is cut.

As described above, the moving frame 120 and the base frame 130 of the present disclosure are configured such that in a portion where they face each other, one is curved and the other is planar, and the holder 190 may be provided to a frame where the facing portion is planar.

Figure 5:
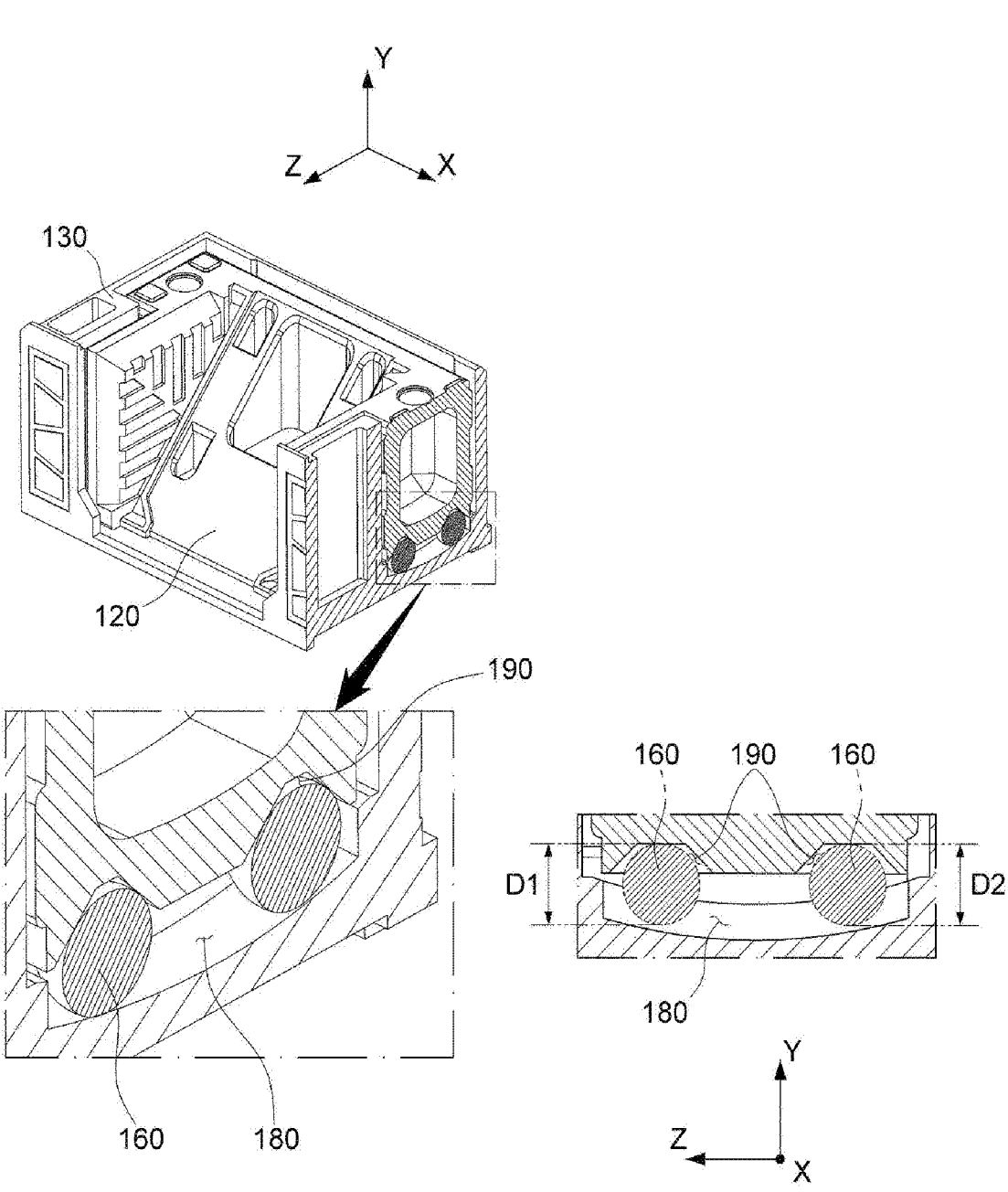
FIG. 5 is a diagram showing a structure of a holder and a guide rail according to an embodiment of the present disclosure.
Figure 6:
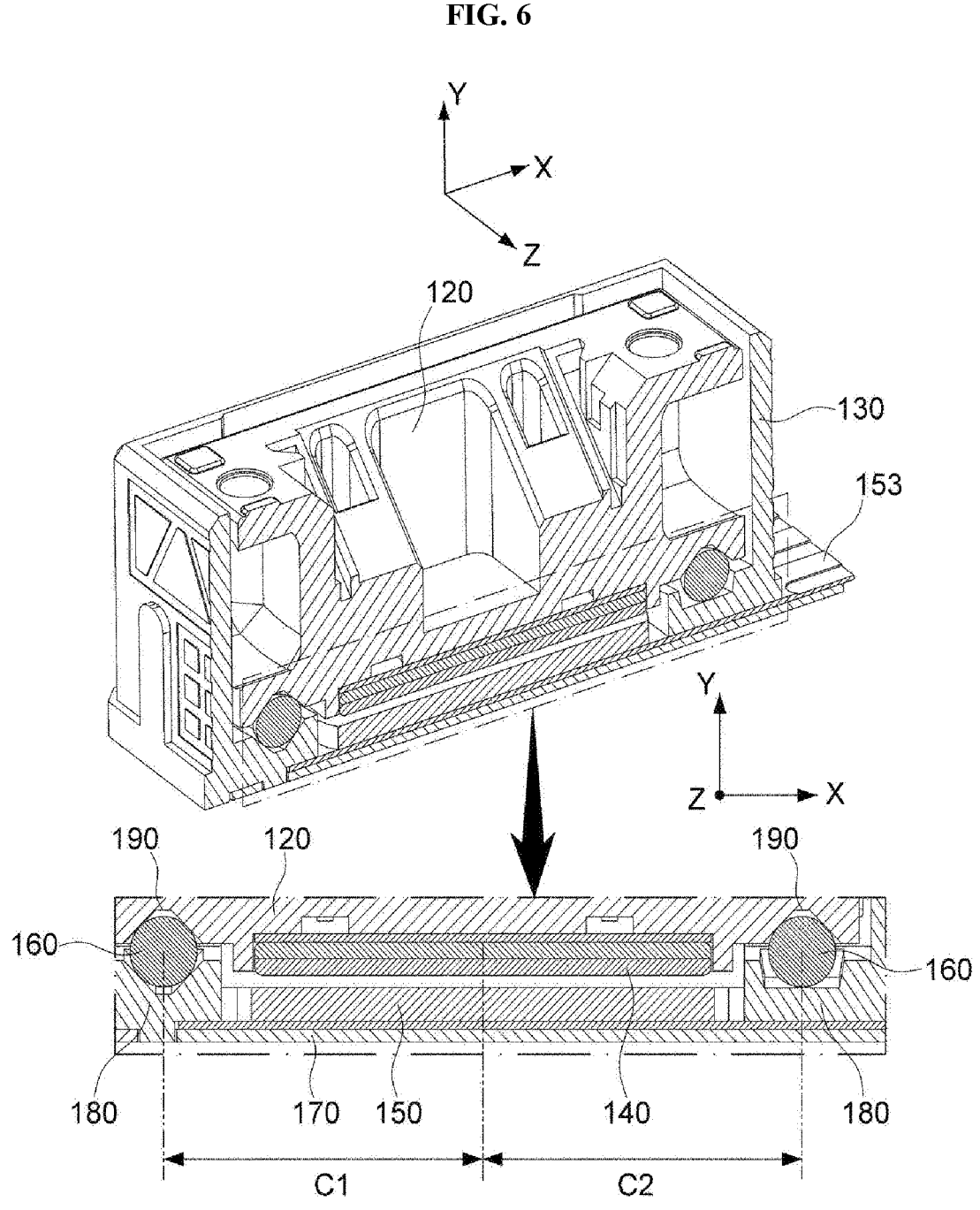
FIG. 6 is a diagram showing an internal structure according to an embodiment of the present disclosure.

FIG. 5 is a diagram showing a structure of the holder 190 and the guide rail 180 according to an embodiment of the present disclosure, and FIG. 6 is a diagram showing an internal structure according to an embodiment of the present disclosure. FIGS. 5 and 6 include perspective views in which a cross-section of a specific part is expressed in order to more clearly explain the structures of the holder 190, the ball 160 and the guide rail 180 of the present disclosure.

When a power of an appropriate magnitude and direction is applied to the driving coil 150 by feedback control based on the output value of the hall sensor 155, an electromagnetic force corresponding thereto is generated at the magnet

140, and the moving frame 120 of the present disclosure is rotated using the generated electromagnetic force as a driving force.

The moving frame 120 of the present disclosure rotates along a path corresponding to the rounded guide rail 180 having an appropriately designed radius of curvature, and this rotational movement is made while being physically supported by the ball 160 as described above.

If the moving frame 120 moves based on the base frame 130, since the ball 160 is also partially accommodated in the moving frame 120, the ball 160 moves together with the moving frame 120 while performing a rolling/rotating motion by itself.

The movement of the ball 160 only means movement on an absolute basis, and as described above, the ball 160 does not move relative to the moving frame 120.

Since the moving frame 120 and the ball 160 move along the guide rail 180 formed on the base frame 130, the moving frame 120 of the present disclosure, namely the reflector 110 installed at the moving frame 120, naturally rotates in a path corresponding to the guide rail 180, thereby implementing OIS in the first direction.

In order to allow the moving frame 120 to rotate more flexibly and stably and further suppress the phenomenon such as tilting, the plurality of holders 190 are preferably configured such that the spaced distances D1 and D2 between the plurality of holders 190 and the guide rail 180 based on the direction facing the guide rail 180 are the same as shown in FIG. 5.

As described above and shown in FIG. 6, the holders 190 of the present disclosure are provided at both sides at symmetrical positions C1 and C2 with respect to the magnet 140 (in the X-axis direction) provided to the moving frame 120, thereby supporting rotational movement of the moving frame 120 more stably.

As shown in FIG. 6, the portion of the moving frame 120 provided with the magnet 140 is preferably configured to descend downward further to the position of the holder 190 based on the Y-axis direction so that the driving efficiency by the driving coil 150 is further improved by bringing the magnet 140 closer to the driving coil 150.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

In the above description of this specification, the terms such as "first" and "second" etc. are merely conceptual terms used to relatively identify components from each other, and thus they should not be interpreted as terms used to denote a particular order, priority or the like.

The drawings for illustrating the present disclosure and its embodiments may be shown in somewhat exaggerated form in order to emphasize or highlight the technical contents of the present disclosure, but it should be understood that various modifications may be made by those skilled in the art in consideration of the above description and the illustrations of the drawings without departing from the scope of the present invention.

What is claimed is:

1. An actuator for a reflector, comprising:
   a moving frame having a reflector configured to reflect light to a lens, and a magnet;
   a base frame configured to provide a moving space for the moving frame;

a driving coil configured to generate a magnetic force at the magnet so that the moving frame rotates based on the base frame;

a guide rail formed at any one of the moving frame and the base frame and having a rounded shape;

a holder provided to any one of the moving frame and the base frame not provided with the guide rail, provided in a direction facing the guide rail, and having a groove shape; and a ball arranged between the guide rail and the holder, and wherein the moving frame rotates along a path corresponding to the guide rail.

2. The actuator for a reflector according to claim 1, wherein the holder includes a plurality of holders arranged side by side to correspond to a longitudinal direction of the guide rail, and wherein the ball is arranged at each of the plurality of holders.

3. The actuator for a reflector according to claim 2, wherein the plurality of holders are spaced apart from the guide rail by the same distance based on the direction facing the guide rail.

4. The actuator for a reflector according to claim 1, wherein an inner surface of the holder includes at least one plane that makes a point contact with the ball.

5. The actuator for a reflector according to claim 4, wherein the plane has a shape that becomes narrower inward.

6. The actuator for a reflector according to claim 1, further comprising:

a yoke provided to the base frame to generate an attractive force at the magnet, wherein a center of a portion of the yoke facing the magnet coincides with a center of the magnet.

7. A camera module, comprising the actuator for a reflector according to claim 1.

* * * * *